United States Patent [19]

Aoki

[11] Patent Number: 4,652,227
[45] Date of Patent: Mar. 24, 1987

[54] ROTARY TYPE INJECTION MOLDING MACHINE

[76] Inventor: Katashi Aoki, 6037 Ohazaminamijo, Sakakimachi, Hanishina-gun, Nagano-ken, Japan

[21] Appl. No.: 736,446

[22] Filed: May 21, 1985

[30] Foreign Application Priority Data

May 22, 1984 [JP] Japan .................................. 59-103457
May 14, 1985 [JP] Japan .................................. 60-101988

[51] Int. Cl.⁴ ............................................. B29C 45/06
[52] U.S. Cl. .................................... 425/191; 264/334; 425/422; 425/438; 425/502; 425/540; 425/556; 425/576
[58] Field of Search ................ 264/318, 334; 425/139, 425/191, 267, 274, 422, 435, 438, 502, 540, 556, 576

[56] References Cited

U.S. PATENT DOCUMENTS 2,408,630 10/1946 Green .................................... 425/422
3,156,008 11/1964 Martin .................................. 425/422
4,139,176 2/1979 Wundsch ............................ 425/438
4,155,698 5/1979 Aichinger ............................ 425/438

FOREIGN PATENT DOCUMENTS 2094220 9/1982 United Kingdom ................ 425/540

Primary Examiner—Jay H. Woo
Assistant Examiner—Timothy W. Heitbrink
Attorney, Agent, or Firm—Ostrolenk, Faber, Gerb & Soffen

[57] ABSTRACT

This invention relates to a rotary type injection molding machine in which plural sets of molds are set on a turntable provided on a machine bed, and molding of articles by injection of synthetic resins and releasing of molded articles are carried out at different positions. The molding machine is designed so that even if the mold is provided with a runner passage, the injection apparatus can be opposed to the clamping direction to cast the resins without being affected by the runner passage, and even in molding articles having threads internally thereof, a releasing means need not be provided for each mold.

10 Claims, 8 Drawing Figures

ROTARY TYPE INJECTION MOLDING MACHINE

BACKGROUND OF THE INVENTION

(1) Field of the Invention

This invention relates to a rotary type injection apparatus used for molding synthetic resins in which a plurality of molds are mounted on a turntable, clamping is performed together with the turntable to effect injection molding, and removing of molded articles is performed by transferring molds to other positions together with the turntable.

(2) Prior Art

A rotary injection molding machine is already known in which a turntable is provided on the upper surface of a machine bed or internally of a fixed table mounted on the machine bed, one of plural sets of split molds are mounted at predetermined intervals whereas the other of split molds are mounted on a clamping table of a clamping device provided opposedly of the turntable, and injection molding and article-releasing are carried out at various positions every stop of the turntable.

Since one of the split molds are mounted on a turntable, pouring of resins into the molds in the aforesaid rotary type injection molding machine is carried out from the side of the molds, in other words, from the direction at a right angle with respect to the clamping direction. Particularly, in the mold provided with a plurality of cavities, a runner passage has to be provided to distribute the resins to these cavities. A runner plate and a mold have to be placed one above the other and set to the turntable in order to form the runner passage. In setting this, consideration has to be made so that in the releasing position, both the molded article and runner may be removed. This poses various problems such that the construction of molds becomes complicated to increase the cost, setting of the runner plate and releasing means for each mold increases the weight of molds, and in addition, the large mass of the turntable requires a great force for rotating and stopping same.

Further, in the rotary type injection molding machine, a cavity gate is provided on a cavity mold to facilitate releasing of the runner, and for a so-called inner gate whereby the resin is poured from the inside of the molded article, a special construction of a mold has to be employed.

SUMMARY OF THE INVENTION

It is therefore an object of the present invention to provide a new rotary type injection molding machine which overcomes the aforesaid problems in a conventional rotary type injection molding machine and in which even if the number of cavities for a set of molds is great and a runner passage for distributing the resins to these cavities need be provided, casting of resins can be carried out opposedly of the clamping direction in a manner similar to that of a conventional injection molding machine.

It is a further object of the present invention to provide a new rotary type injection molding machine in which a runner plate and a releasing means need not be provided for each mold, the runner plate can be mounted through a turntable on a core mold positioned in a molding station, and the runner plate can be moved externally of the turntable after completion of molding whereby the weight of the turntable may be reduced and the mold construction may be simplified.

It is another object of the present invention to provide a molding machine which can be also applied to injection molding for products having a screw such as a cylinder internally provided with a screw nut or a nut screw. Generally, a mold on which a core is rotatably mounted is used to mold the screw cap. The core is constructed such that it has a screw in the periphery thereof and connected to a rotating means provided on the clamping device of the mold holding table and when the mold is opened the core is rotated to pull out a molded article.

Because of such an arrangement as described above, the molding machine for the screw caps has a problem in that the construction of molds and clamping device becomes complicated as compared with conventional molding machines for articles, and releasing of molded articles is time-consuming.

Accordingly, it is the aforesaid objects of the present invention to provide a rotary type injection molding machine for molding threaded articles in which even in molding screw caps or the like, the mold and clamping device have the same construction as that of the case where normal articles are molded, and when a molded article is released, the core need not be rotated and the molded article transferred from the molding station to the releasing station by the turntable may be rotated by the releasing device to thereby release it from the core very easily.

To achieve the aforementioned objects, the present invention provides a rotary type injection molding machine in which a turntable is provided internally of one of fixed tables opposedly provided on the machine bed, core molds of split molds are mounted in symmetrical positions of the turntable, a cavity mold is mounted on a clamping table of a clamping device provided opposedly of the turntable, and injection molding and releasing of a molded article are carried out in different positions every stoppage of the turntable, wherein a runner plate which is moved within a depression provided internally of the fixed table through a hole formed in the turntable is provided on the core mold positioned in the molding station, the runner plate being connected to a hydraulic device on the side of the fixed table, a runner passage which connects a resin path provided interiorly of the core mold and a gate of the runner plate with which the injection apparatus nozzle-touches is formed in the boundary between the runner plate and the core mold, and a hole for removing the runner is provided in a portion positioned in the releasing station of the fixed table.

The present invention will now be described in detail by way of embodiments shown in the accompanying drawings.

BRIEF DESCRIPTION OF THE DRAWINGS

The drawings show an embodiment of a rotary type injection molding machine in accordance with this invention.

DETAILED DESCRIPTION OF THE INVENTION

Figure 1:
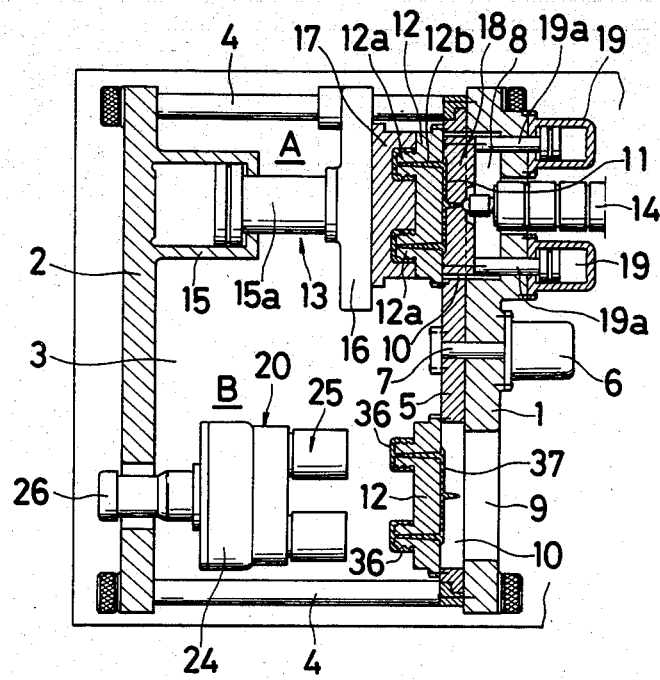
FIG. 1 is a sectional plan view showing essential parts.

In the illustrated embodiment, there is shown a rotary type injection molding machine used when a plurality of screw caps are molded. Reference numerals 1, 2 designate fixed tables opposed provided on a machine bed 3 at required intervals, the fixed tables being connected by a plurality of tie bars 4, 4.

Internally of one of the fixed tables 1 is mounted a turntable 5 with the periphery thereof held on a member 5a. The turntable 5 has connected to its center a rotational shaft 7, the rotational shaft 7 extending through the fixed table 1 and being connected to a drive device 6 mounted externally of the fixed table 1. The drive device 6 comprises a swinging motor which effects a reciprocating motion through an angle of 180° by oil pressure or electricity, and the turntable 5 effects reciprocating rotation in a vertical direction along the fixed table 1 by the operation of the drive device 6.

Holes 10, 10 having a required size where a runner plate described later is positioned are formed in horizontal symmetrical positions of the turntable 5, and a depression 8 to accommodate the runner plate therein and a hole 9 for removing the runner are provided in two locations of the wall of the fixed table 1 in registration with these holes 10, 10.

Core molds 12, 12 having a plurality of cores 12a, 12a formed with threads in the outer periphery thereof are mounted on the portions of the holes 10, 10 of the turntable 5 with their back sides facing to the holes 10, 10. In the midst of each of the cores 12a there is provided a resin path 12b bored from the back side of the core mold 12 to the core end, the resin path 12b being connected to a runner passage 11 formed in the boundary between the core mold 12 and a runner plate 18 provided on the back side of the core mold.

In the stopping positions of the plurality of core molds 12, 12, a clamping device 13 and a releasing device 20 are opposedly provided on the turntable 5, and an injection apparatus 14 is disposed externally of the fixed table 1 opposed to the clamping device 13. One side of the machine bed 3 forms a molding station A and the other forms a releasing station B.

The clamping device consists of a hydraulically-operated clamping cylinder 15 provided on the other fixed table 2 and a clamping table 16 connected to the end of a clamping ram 15a and adapted to be moved while being guided by the tie bar 4, and a cavity mold 17 having the same number of cavities as that of the cores 12a is mounted on the clamping table 16.

The injection apparatus 14 is provided movably forward and backward with the end portion inserted into the depression 8 of the fixed table 1, and the nozzle at the end is in nozzle touch with the gate of the runner plate 18.

Figure 2:
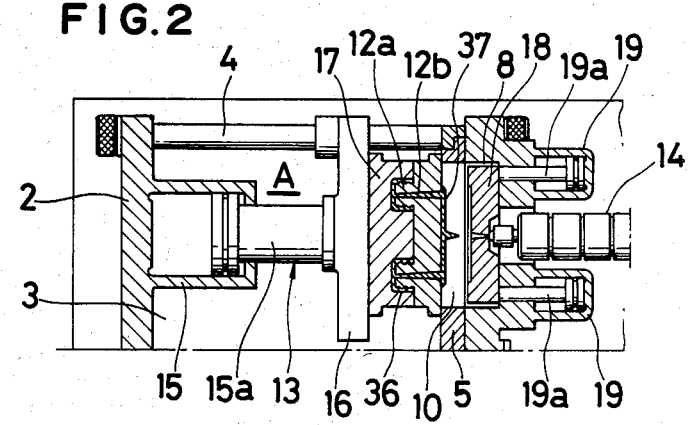
FIG. 2 is a sectional plan view of a molding station when a mold is opened.
Figure 3:
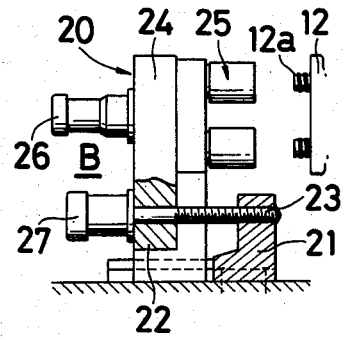
FIG. 3 is a side view with a part of a releasing device cut away.
Figure 4:
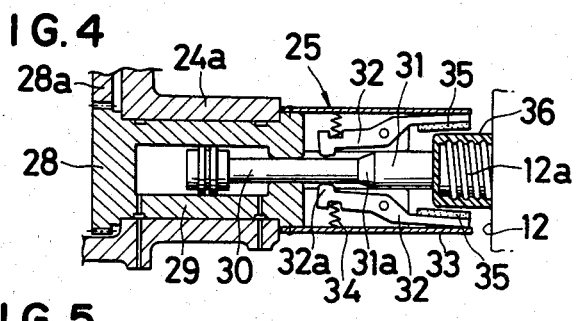
FIGS. 4 to 6 are longitudinal sectional side views of a chuck device, showing in order the steps of releasing a molded article from a core.

The runner plate 18 is connected to piston rods 19a, 19a which extend through the fixed table 1 into the depression from two units of hydraulic cylinders 19, 19 mounted externally of the fixed table 1, and as the piston rods 19a, 19a expand, the runner plate is moved forward and backward together with the injection apparatus 14 and when the turntable 5 is rotated, the apparatus is moved from the hole 10 to the depression 8 as shown in FIG. 2.

The releasing device 20 comprises a fixed member 21 provided on the machine bed 3, a movable member 22 movably connected to the fixed member 21 while a threaded shaft 23 screwed therein, and a gear box 24 provided above the movable member 22, and the same number of chuck devices 25 as that of the cores 12a are provided on the front surface of the gear box. The chuck device 25 is actuated by an electric motor 26 mounted on the rear surface of the gear box 24. Forward and backward movements of the chuck device 25 to the core mold 12 are carried out by the rotation of the threaded shaft 23 actuated by a variable speed electric motor 27 mounted on the movable member 22. The chuck device 25 comprises a cylinder 29 having at its rear end a gear 28 which is rotatably provided within a cylindrical portion 24a projected on the front wall of the gear box 24 and meshes with a transmission gear 28a within the box, an opening and closing member 31 connected to the end of a piston rod 30 projected from the cylinder and having a taper surface 31a, a pair of chuck members 32, 32 positioned on both sides of the opening and closing member 31 and having a cam 32a projected from the innerside at the rear side thereof, the cam 32a being in contact with the piston rod 30 and the side of the opening and closing member 31, a cylindrical cover 33 at the end of the cylinder encircling the chuck members 32, 32, and a spring member 34 provided internally of the cover 33 and extending over the rear ends of the chuck members 32, 32 and the cover 32, and a non-slip element 35 is mounted internally at the end of the chuck member 32.

In the molding machine constructed as described above, a molded article 36 in the periphery of a screw core subjected to injection molding and a runner 37 at the rear of the core can be transported together with a screw mold 12 by the 180° rotation of the turntable 5 after the mold is opened to a position opposite the chuck device.

Figure 5:
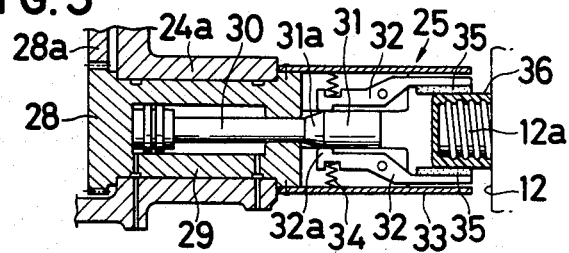
Figure 6:
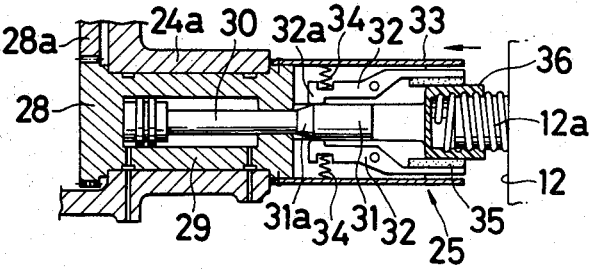

In the state where the chuck members 32, 32 are open, the releasing device 20 is moved forward by the rotation of the threaded shaft 23 to accommodate the molded article 36 within the cover 33 in the state shown in FIG. 5 and backwardly move the piston rod 30 as shown in FIG. 6. Then, the article 36 is held by the chuck members 32, 32, after which the releasing device 20 is moved backward to its original position in synchronism with the screw removing speed by the variable speed motor 27 while rotating the chuck members 32, 32 together with the cylinder 29 (FIG. 6).

With this, even if the core 12a of the core mold 12 is locked, releasing of the molded article 36 can be carried out.

Releasing of the runner 37 exposed to the hole 10 of the turntable 5 can be easily carried out by inserting removing units into the holes 9, 10 from the outside of the fixed table 1 to pick out the runner 27.

The core molds 12, 12 after the molding and releasing have been completed are alternately exchanged in position into the molding station A and releasing station B by the 180° rotation of the turntable 5, the runner plate 18 moved back to the depression 8 is urged against the back side of the core mold 12 in the state of FIG. 1 by the operation of the hydraulic cylinders 19, 19 after the turntable 5 has been stopped, and the clamping table 16 is moved forward by oil pressure for accomplishment of clamping. The resin is cast into the cavity from the injection apparatus 14 via the runner passage 10 and resin path 12b, and in the releasing station B, releasing of the molded article 36 from the runner 37 is carried out under the steps similar to those described above.

Figure 7:
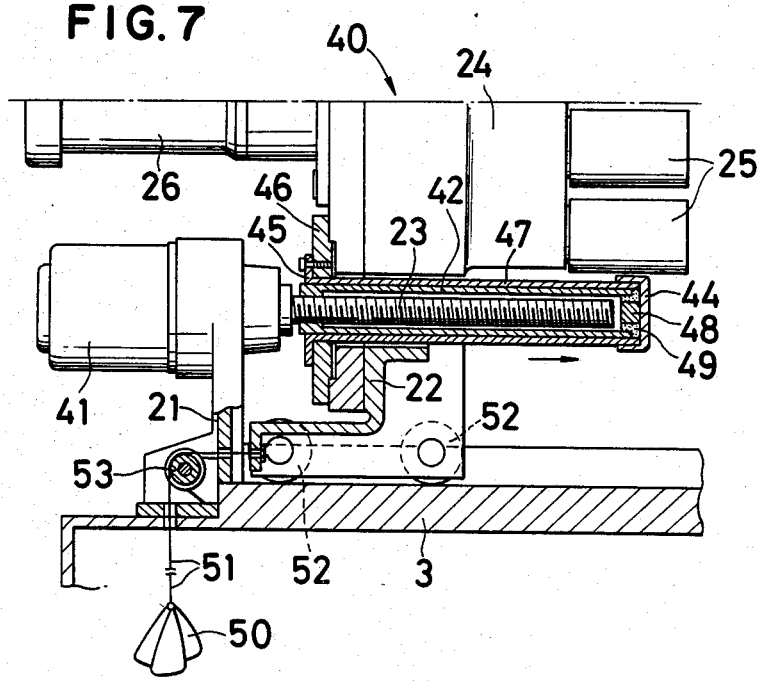
FIG. 7 is a longitudinal sectional side view showing essential parts at a retracted position of a releasing device in accordance with a further embodiment.
Figure 8:
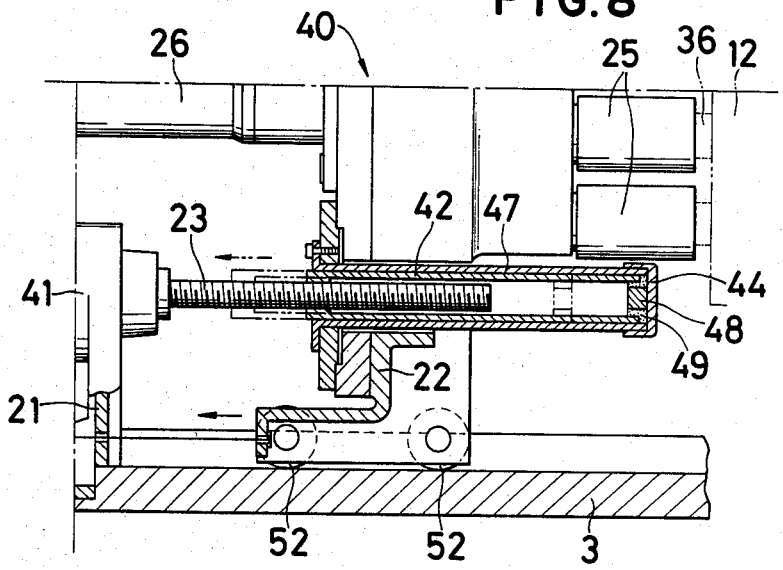
FIG. 8 is a longitudinal sectional side view showing essential parts at an advanced position of the releasing device.

FIGS. 7 and 8 show a releasing device 40 in which the forward movement of the aforementioned chuck device 25 is carried out by the rotation of the threaded shaft 23 but the backward movement thereof is carried out by the load of a weight attached to the rear portion of the movable member 22.

An electric motor 41 for moving forward the chuck device 25 together with the movable member 22 and gear box 24 to the core mold 12 is mounted on a fixed member 21 provided on the machine bed 3 at the rear of the movable member 22. This motor 41 is of the conventional type to which the threaded shaft 23 is directly connected. An inner casing 42 and an outer casing 47 are put over the circumference of the threaded shaft 23. Although a relevant figure was not drawn, the inner casing meshed with the threaded shaft 23 is disposed so that it may move in the direction of axis thereof by means of engagement of both a pin on the inner casing and a linear groove made on the outer casing and fore end is closed by a cap member 44 and the rear end is connected to the movable member 22 through a flange 45 and a retaining plate 46. Within the end of the inner casing 42, a permanent magnet 48 provided on the end of the outer casing 47 to attract the cap member 44 is embedded into a plastic member 49. The threaded shaft 23 is inserted through the movable member 22 together with the double casing, and a weight 50 is attached by a wire 51 to the rear end of the movable member 22. A reference numeral 52 designates a roller, and 53 is a wire wheel.

In the releasing device 40 constructed as described above, when the threaded shaft 23 is rotated by the motor 41, the inner casing 42 is moved together with the outer casing 47 to move forward the movable member 22 as shown in FIG. 8. When the molded article 36 is gripped by the chuck members 32, 32 as shown in FIG. 6 by the operation of the chuck device 25 and thereafter the threaded shaft 23 is reversely rotated, only the inner casing 42 is returned to its original position whereas the outer casing 47 remains stayed at its position together with the movable member 22 and the chuck device 25.

When the chuck device 25 is rotated halfway of backward movement of or after backward movement of the inner casing 42, since the load of the weight 50 is always imposed on the movable member 22, the chuck device 25 is moved back through an amount equal to a thread pitch of the core 12a together with the movable member 22 to release the molded article 36 from the core 12a. When this molded article is released, since none is present to restrain the movable member 22 at the advance position, the movable member 22 is pulled back to its original position together with the chuck device 25 by the load of the weight 50. As a consequence, the releasing speed may be adjusted to the thread pitch in the periphery of the core without rotating the threaded shaft 23 by the use of the variable speed motor.

What is claimed is:

1. A rotary injection molding machine, comprising: first and second oppositely located tables and a machine bed on which the tables are fixedly supported;
a turntable supported on and extending generally parallel to the first table, and means for rotating the turntable;
a clamping device and a releasing device for removing a molded article, the clamping and releasing devices being located on the second table on a side thereof which faces the first table;
a plurality of cores mounted on the turntable on a side thereof which faces the second table, the turntable being selectively rotatable so that any one of the cores may be positioned in line with a selected one of the clamping device and the releasing device;
means for moving the clamping device towards and away from the first table, the clamping device having a mold piece thereon for defining a mold cavity between the mold piece and one of the cores when the clamping device is positioned toward the first table;
a molding station for carrying out injection molding operations located on that side of the first table which faces away from the second table and a runner plate disposed between the molding station and the first table;
passage means formed in the cores for defining a passageway into the mold cavity; and
means for selectively moving the molding station and the runner plate to first and second positions located, respectively, toward and away from the turntable, in the first position the runner plate defining a runner passage between itself and the core which runner passage communicates with the passage means for enabling injection of resin from the molding station through the runner and into the mold cavity, in the second position the runner and molding station enabling the turntable to rotate whereby the molded article formed in the mold cavity may be moved to the releasing device to be released from the core on which said molded article is located.

2. A rotary injection molding machine according to claim 1, wherein said clamping device comprises a hydraulically-operated clamping cylinder provided on the second fixed table, a clamping ram and clamping table connected to the clamping ram, said clamping table being movable and being guidable by stationary tie bars.

3. A rotary injection molding machine according to claim 1 wherein each of said cores has threads in a periphery of the core.

4. A rotary injection molding machine according to claim 1, wherein the means for rotating the turntable comprises a drive device which is hydraulically-operated.

5. A rotary injection molding machine according to claim 1, wherein said runner plate is connected to a piston rod of a hydraulic device, said hydraulic device having a hydraulic cylinder secured externally of said first table.

6. A rotary injection molding machine according to claim 1, wherein said releasing device comprises a fixed member supported on the machine bed, a movable member movably connected by screwing a threaded shaft into said fixed member, a gear box and a plurality of chuck devices which are provided on said movable member, and a motor for rotating the threaded shaft secured to said movable member, said plurality of chuck devices being movable forward and backward by the rotation of said threaded shaft.

7. A rotary injection molding machine according to claim 6, wherein the chuck devices of said releasing device comprise a gear box provided above said movable member, a required number of cylinders being rotatably mounted on said gear box and meshing with gears located within said gear box, an opening and closing member for the chucks being provided on the end of the piston rod projecting from each cylinder and having a tapered neck, a cylindrical cover at the end of the cylinder encircling said opening and closing member for chucks, and a pair of chuck members mounted on the shaft internally of said cylindrical cover, said chuck members each having a cam located inside at a rear end thereof so as to always contact with a side of said piston rod by means of spring pressure, said chuck members having a non-slip element, said non-slip element located inside each of said chuck members at one end thereof.

8. A rotary injection molding machine according to claim 6, wherein said releasing device comprises a conventional electric motor on the fixed member, said electric motor provided at the rear of the movable member, a threaded shaft directly connected to said electric motor, a double casing in a periphery of the threaded shaft, said double casing comprising an inner casing meshed with the threaded shaft and an outer casing in contact with the inner casing, said outer casing having a rear end connected to said movable member and a fore end closed, and a weight attached to the rear end of the movable member to exert a backward pull on the movable member.

9. A rotary injection molding machine according to claim 1, wherein the means for rotating the turntable comprises a drive device which is electrically-operated.

10. A rotary injection molding machine as in claim 1 in which the first fixed table has a predetermined thickness and in which the turntable is located within an opening in the first fixed table and contained within said predetermined, thickness and wherein there is further defined a depression extending along the thickness dimension of the first fixed table said runner being located in said depression when said inner is in the second position.

* * * * *